Aug. 9, 1949.  M. VOITY  2,478,880
APPARATUS FOR MANUFACTURING SLIDE FASTENERS
Filed July 29, 1943  4 Sheets-Sheet 1

INVENTOR
MAURICE VOITY
BY
ATTORNEY

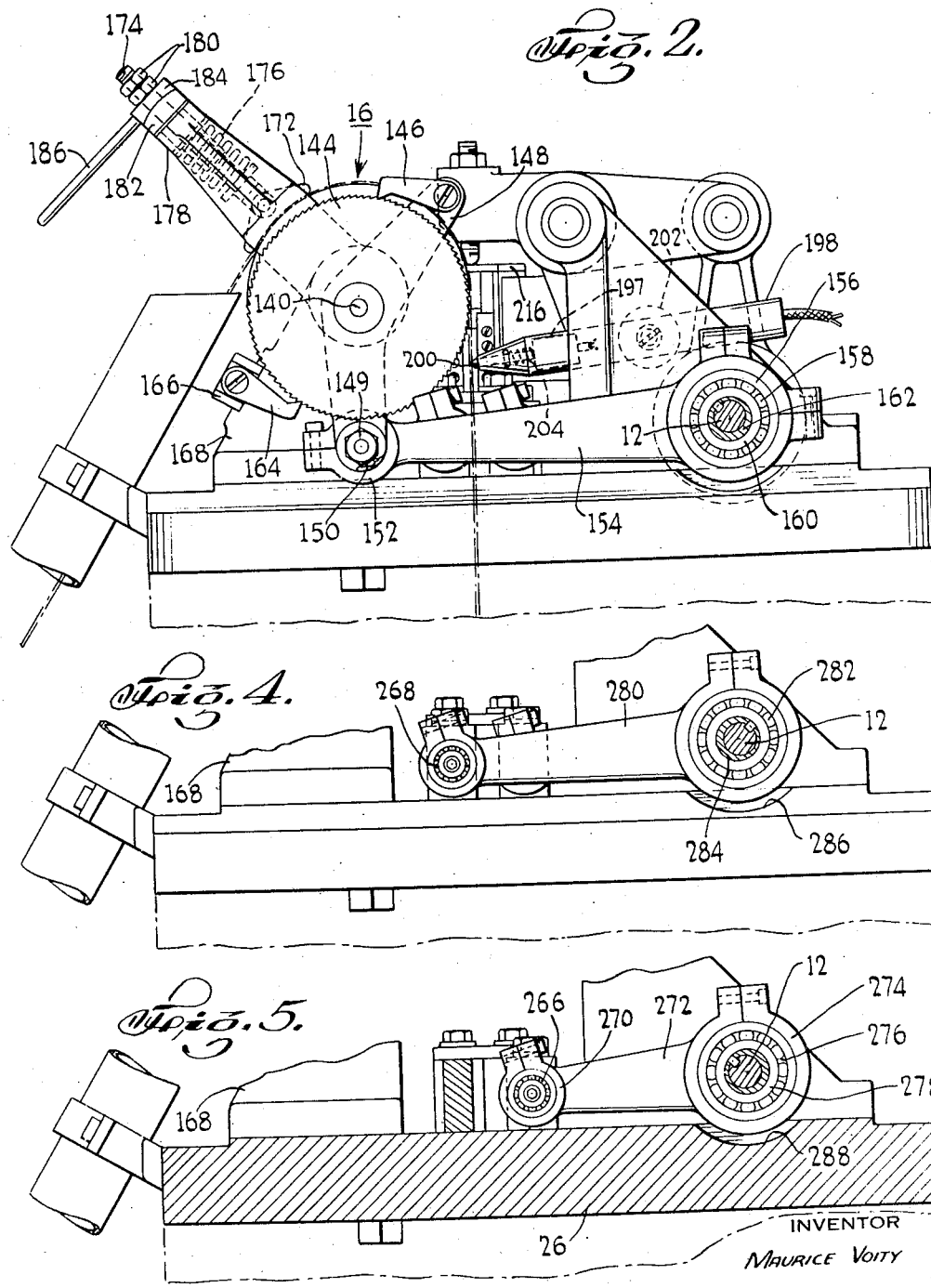

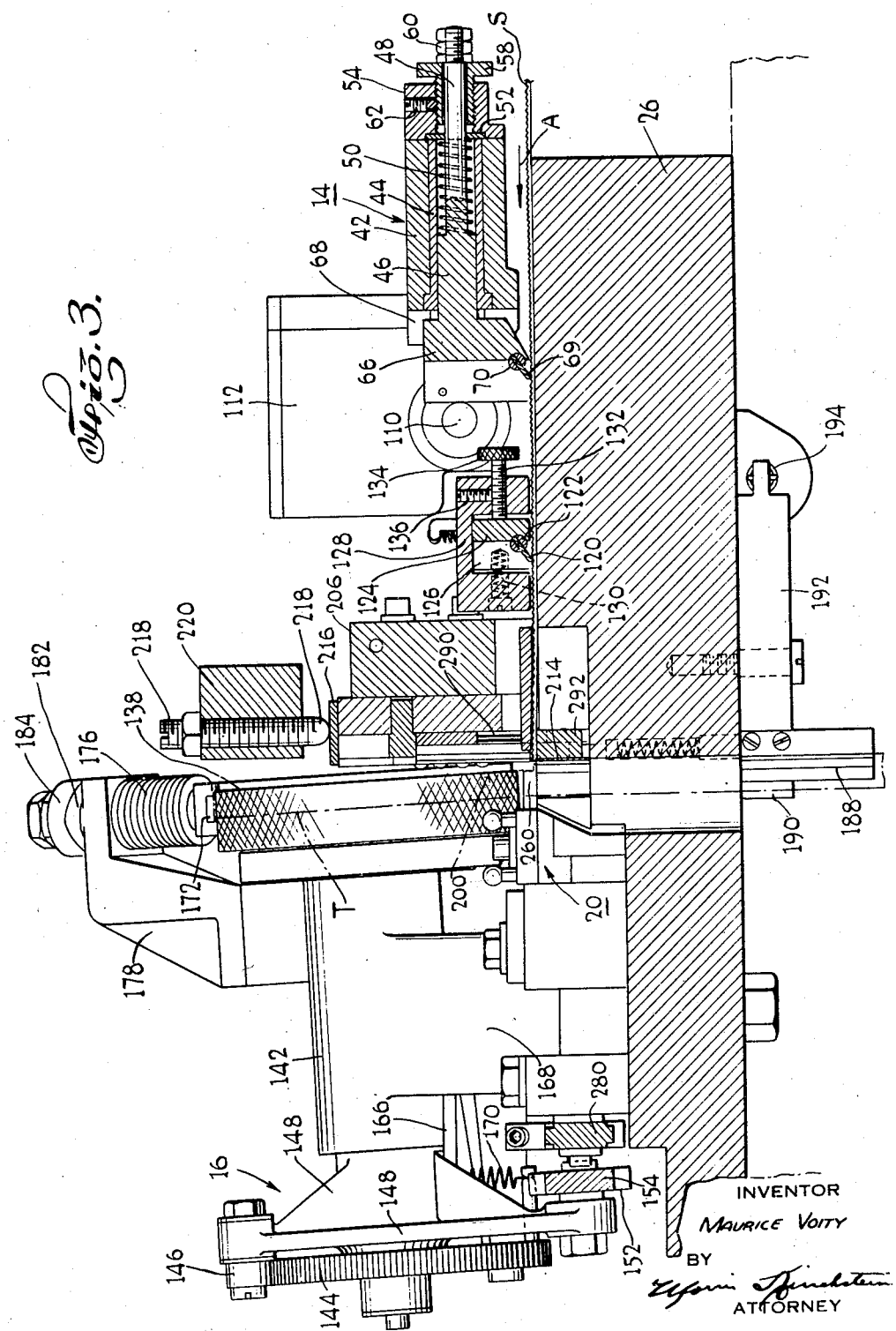

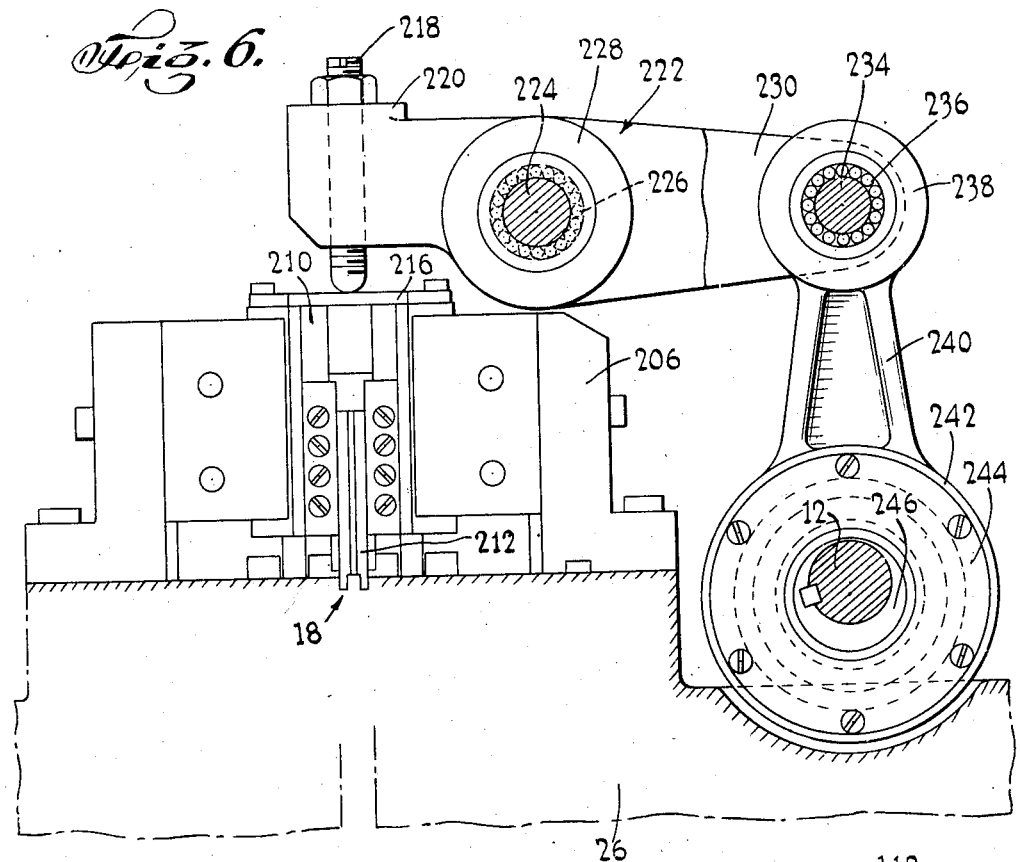
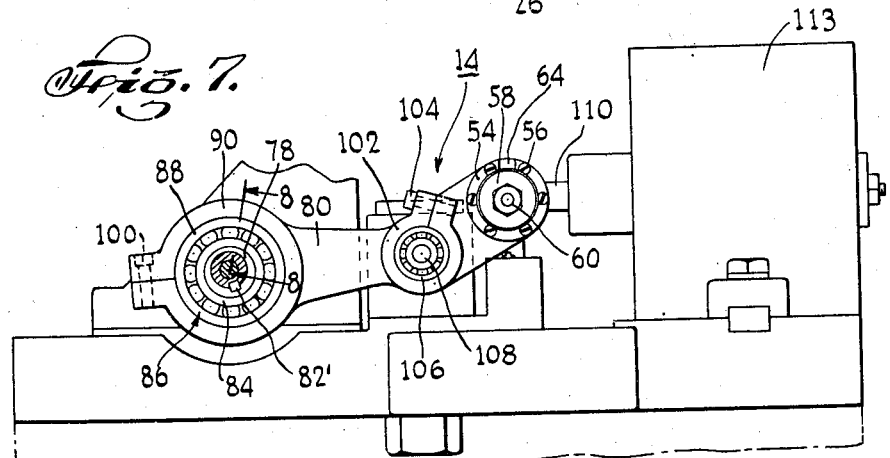
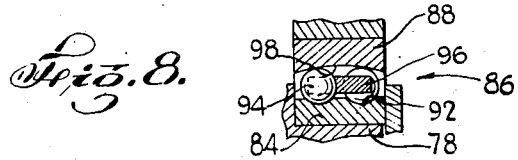

Patented Aug. 9, 1949

2,478,880

UNITED STATES PATENT OFFICE 2,478,880

APPARATUS FOR MANUFACTURING SLIDE FASTENERS

Maurice Voity, Bayside, N. Y., assignor to Serval Slide Fasteners, Inc., a corporation of New York Application July 29, 1943, Serial No. 496,571

4 Claims. (Cl. 153—1)

This invention relates to an apparatus for manufacturing slide fasteners from long strips.

The principal object of the invention is to provide an apparatus of the character described, which can operate at speeds greatly in excess of those now attained without sacrificing precision in severing and clamping the slide fastener elements. At the present time apparatuses of similar character run at about 2,100 cycles of operation per minute. In accordance with the present invention I attain speeds of from 3,250 to 4,500 such cycles per minute.

A further object of the invention is to provide an apparatus of the character described which, in spite of its remarkable speed, shall have such durability that it can run for months without repairing or replacing parts other than the severing and clamping dies.

Another object of the invention is to generally improve an apparatus of the character described, particularly in relation to the severing and clamping apparatus shown and described in my copending application for Method and apparatus for manufacturing slide fasteners, Serial No. 436,279, filed March 26, 1942, now Patent No. 2,396,933.

Other objects of the invention will in part be obvious and in part hereinafter pointed out.

The invention accordingly consists in the features of construction, combinations of elements and arrangement of parts which will be exemplified in the construction hereinafter described and of which the scope of application will be indicated in the appended claims.

In the accompanying drawings in which is shown one of the various possible embodiments of this invention, Fig. 1 is a top plan view of an apparatus embodying the present invention;

Fig. 2 is an enlarged sectional view therethrough taken substantially along the line 2—2 of Fig. 1, and is illustrative of the improved mechanism employed to actuate the tape feeding means from the drive shaft;

Fig. 3 is an enlarged sectional view taken substantially along the line 3—3 of Fig. 1, and is illustrative of the improved mechanism employed to intermittently stop the strip feeding means in order to provide spaces between groups of slider elements clamped on a tape;

Figure 1:
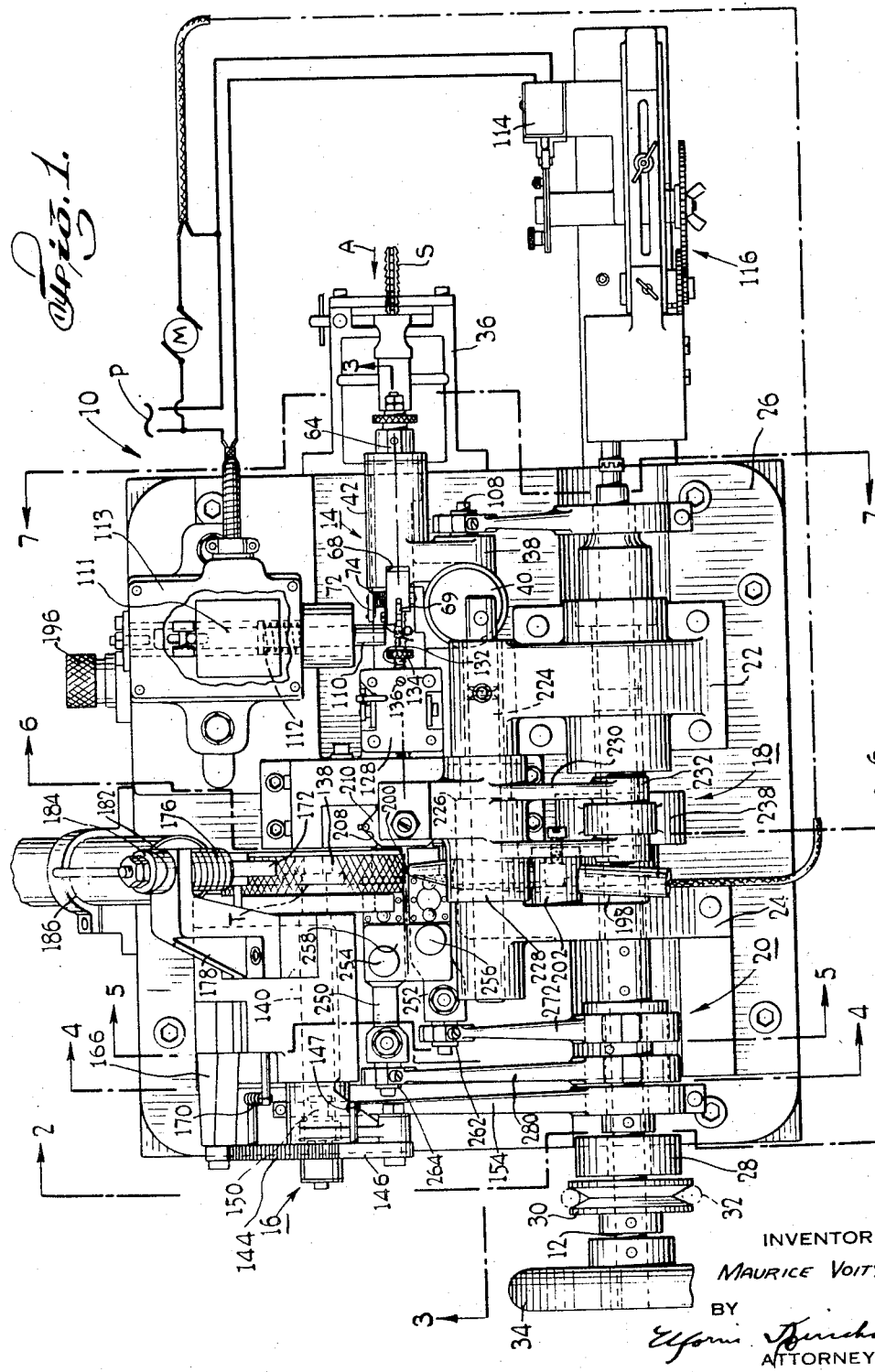

Figs. 4 and 5 are enlarged sectional views taken substantially along the lines 4—4 and 5—5 respectively of Fig. 1, and are illustrative of the improved mechanism employed to actuate the clamping means from the drive shaft;

Fig. 6 is an enlarged sectional view taken substantially along the line 6—6 of Fig. 1, and is illustrative of the improved mechanism employed to actuate the severing means from the drive shaft;

Fig. 7 is an enlarged sectional view taken along the line 7—7 of Fig. 1, and is illustrative of the improved mechanism employed to actuate the strip feeding means from the drive shaft; and Fig. 8 is an enlarged sectional view taken along the line 8—8 of Fig. 7, and is illustrative of the construction of a self-aligning anti-friction bearing.

In general how I attain the objects of this invention will be understood from the following considerations:

For a long time in the design of machines of the character described it has been customary to employ cams and followers for actuating the various operative means (strip feed, etc., hereinafter referred to) from the drive shaft, heavy back springs having been used to hold the followers against the cams. By embodying various refinements, such as lightening and balancing of parts and using a single drive shaft, these machines were brought up to speeds of about 2,100 cycles per minute. But when attempts were made to further substantially increase their speed the machines ran asynchronously, severed and clamped elements inaccurately, wore rapidly, and overheated quickly despite the use of elaborate oiling systems and excellent anti-friction bearings.

In accordance with my invention, I provide actuating mechanisms for the various operative means whereby unusually high speeds of operation are obtained, considerably in excess of the highest speed obtainable heretofore, without entailing the difficulties and disadvantages above mentioned. In this aspect of the invention I have departed from the attempts others have heretofore made to obtain speed increases by changes in the operative means themselves, but have directed my improvements rather to the actuating mechanisms which hitherto by their very nature have prevented attaining such higher speeds.

In general I provide positive actuation of the operative means by eccentric sheaves and rods. Certain of the operative means, for example the means for feeding the strip and the means for clamping elements on the tape, oscillate about axes not parallel to the axis of the drive shaft and shift transversely of the eccentrics. I overcome the effect of such shifting by swiveling the eccentric rods at both ends, as on self-aligning anti-friction bearings. The term "anti-friction bearing," as employed herein, denotes a bearing having a plurality of rolling contact elements, such as a roller bearing or ball bearing. I have found that this generates but little heat, is very durable and does not noticeably increase the stress on any of the rapidly moving parts.

Heretofore the mechanism for providing gaps between groups of elements had taken advantage of the impositive connection between the cam and follower and held the follower at its point of maximum departure from the drive shaft so that continued movement of the cam would not affect any feed of the strip. I have retained this simple interrupting means by providing an impositively driven member in the strip feeding means itself.

*General description of machine*

Referring now in detail to the drawings, 10 denotes a stringer fabricating machine embodying the invention and adapted to operate upon a preformed strip S such as shown and described in detail in my said copending application. This strip, as is well known, may comprise a series of closely spaced projections and associated underlying depressions arranged longitudinally of the strip and provided with lateral flats. The longitudinal edges of the strip are toothed to facilitate the formation of square corners on the jaws of the slide fastener elements. It should be understood, however, that the formation of the strip has no bearing on the improvements in the machine forming the subject matter of the present invention.

The machine 10 essentially comprises four operative means which are intermittently actuated in properly timed relationship once every revolution of the drive shaft 12. These are a means 14 for feeding the strip S, a means 16 for feeding the tape T, a means 18 for severing the foremost slide fastener element from the strip S, and a means 20 for clamping said element on the tape T. These four means are the essential active operating parts of the machine and are those which in accordance with the present invention are actuated by eccentric sheaves and rods from the drive shaft 12.

Said drive shaft is mounted for horizontal rotation in two main bearings 22, 24 bolted to the bed 26 of the machine and a side bearing 28 attached to an edge of said bed. The drive shaft may be actuated in any suitable fashion as through a pulley 30 which is connected by a belt 32 to the drive pulley of an electric motor M (schematically indicated). A hand wheel 34 may also be provided to turn the drive shaft 12 over by hand when the machine is set up.

The four operative means will now be briefly outlined and the mechanisms for actuating each described in detail.

*The strip feeding means and associated structure*

The prefabricated strip S which is supplied from a reel (not shown) slides over the oiling pad of a strip lubricating box 36 (Fig. 1) and is advanced during an interval preceding the cutting and clamping of a slide fastener element by the strip feeding means 14. Said means comprises a feed dog fitting 38 pivoted on a post 40 projecting upwardly from the bed 26. The fitting 38 includes a barrel 42 lined with a sleeve 44 (Fig. 3) in which the plunger 46 of a shaft 48 is slidably received. A heavy back spring 50 encircling the shaft 48 urges the plunger 46 in the direction of travel of the strip S (indicated by the arrow A).

Said spring, which is strong enough not to be noticeably deflected by the drag of strip during the operative stroke of the strip feeding means, is held under compression between the plunger and a washer 52 clamped to the rear of the barrel 42 by a cap 54 secured with screws 56 (Fig. 7) to the feed dog fitting 38. The cap is centrally bored and tapped to threadedly retain a flanged bushing 58 through which the shaft 48 freely extends. The portion of said shaft projecting beyond the bushing is threaded to accommodate nuts 60 which are of such external dimensions as to abut against the rear of the bushing 58 under pressure of the back spring. A set screw 62 threaded into a tapped aperture in a ridge 64 (Fig. 1) on the cap 54 serves to lock the bushing 58 in any adjusted position.

Manipulation of the bushing 58 and nuts 60 regulates the extended position of the plunger 46 with accuracy and ease.

To prevent rotation of said plunger, the forward end thereof is vertically elongated to provide a head 66 which is horizontally slidable in a slot 68 running down the front of the barrel 42. The front face of the head 66 is likewise slotted to accommodate a feed element or dog 69, this latter slot being bridged near the bed 26 by a horizontal shaft 70 extending normal to the direction A of strip feed and carrying the radially secured feed dog. One end of the shaft 70 which projects beyond a side of the head 66 has an arm 72 affixed thereto which is encircled by a torsion spring 74. Said spring is anchored at one end to a screw 76 secured in the plunger head 66 and at the other end has a bent leg passing through a hole in the arm 72 so that it biases the shaft 72 in a counterclockwise direction as viewed from Fig. 3. This permits the feed dog 69 when operatively moved in the direction A of strip feed to engage a projection on the strip S and push said strip toward the severing means 18. It also permits the feed dog to rotate clockwise against the torsional pressure of the spring 74 when pulled back over the next succeeding projection during its retrograde stroke.

Pursuant to the principal object of my invention, I operate the strip feeding means 14 from the driveshaft 12 with a positive actuating mechanism such as an eccentric sheave 78 (Fig. 7) and eccentric rod 80. The eccentric sheave 78 is fixed to the driveshaft with a key 82 and is force-fitted in the inner race 84 of a self-aligning anti-friction bearing 86, the outer race 88 of said bearing being secured in the strap end 90 of the eccentric rod 80.

The term "self-aligning bearing" as employed herein denotes a bearing whose outer race can oscillate about an axis perpendicular to the axis of rotation of the inner race and vice versa. A section through such a bearing is shown in Fig. 8. As is apparent from this figure, the bearing 86 may include an inner race 84 having two confining grooves 92 in which two rows of balls 94 are held. The balls are kept in rows by a cage 96 which also spaces them in staggered relationship, i. e., with a ball in one row between two spaced balls in the other row. The outer race 88 has on inner spherical surface 98 which rides on the two rows of balls. Thus the inner race can rock within the outer race while either or both races are rotating.

To facilitate assembly of the eccentric rod on the bearing 86, I may split the strap 90 and with a screw 100 clamp the split ends about the outer race of said bearing.

The small or gudgeon end of the eccentric rod 80 is likewise provided with a split collar 102 and clamping screw 104. Said collar carries a small self-aligning anti-friction bearing 106 secured to a stud 108 on the feed dog fitting 38 extending at an angle to the plane in which the eccentric sheave 78 rotates.

By employing the self-aligning bearings 86 and 106 in the actuating mechanism for the strip feeding means the eccentric rod 80 is permitted to swivel at two points, to wit, (1) where it is connected to the eccentric sheave 78, and (2) where it is connected to the stud 108. In this manner I avoid providing lost motion between the eccentric sheave and feed dog fitting to compensate for oscillation of said fitting about an axis aparallel to the driveshaft.

Although the connection between the drive shaft 12 and fitting 38 is positive, the strip feed means is so constructed, as described above, that lost motion is present between said fitting and the feed dog 69. This construction is utilized to stop feed of the strip when gaps are to be formed between groups of slide fastener elements on the tape T. To render the strip feeding means ineffective, even though positively actuated, I provide an element which is projectible into the path of the plunger 46 near the end of its retrograde or non-feeding stroke. Such an element may consist of a hardened steel pin 110 which is operated by a solenoid 111 and travels along a line transecting the path of travel of the plunger head 66. The pin is normally maintained in retracted position by a spring 112 in the solenoid housing 113. However, when the electric circuit from the source of power P for energizing the solenoid is closed by a micro-switch 114 which is actuated by a counter 116, the solenoid overcomes said spring 112 and thrusts the pin 110 into the path of travel of the plunger head 66 to block the same.

If at the instant the pin is urged into blocking position the head is not near the end of its retrograde stroke, the pin will merely ride on the side of the head, but shortly thereafter, when the pin clears the front face of the head, it will quickly spring into blocking position. A slight clearance is provided between the pin and front face of the head in extreme retrograde position so that the pin can be retracted easily when the fitting 38 is at the end of its retrograde stroke.

I have found that even at the extreme speed of 4,250 cycles per minute, of which the apparatus 10 is capable, the foregoing construction operates efficiently to space groups of elements and control the number of elements in each group with absolute accuracy.

A check dog 120 is employed to prevent the strip S from being pulled back during retrograde movement of the feed dog 69. Said check dog is radially fixed in a shaft 122 journalled in a block 124, and operates in a slot 126 running down the front face of said block. The undersurface of the block is grooved to permit passage of the strip. To facilitate adjustment of the check dog, the block 124 is slidably received in a casing 128 set on the bed 26. The block is biased rearwardly by a spring 130 against the tip of a bolt 132 which can be adjusted by manipulation of its knurled head 134. The bolt is fixed in adjusted position by a set screw 136.

It will be perceived that by employing screw adjustments, I am able to precisely locate the feed and check dogs—a matter of importance in a machine running at the high speed attained by my apparatus. In such an apparatus it is imperative to have the foremost slide fastener element located exactly relative to the severing means 18 prior to severing and clamping said element. A piloting mechanism, as for example that shown in my copending application can not alone be relied upon to properly position the strip prior to severing since at the high speed of operation of the machine a piloting mechanism cannot shift the strip as far and fast as it can in slower machines. However, with the feed and check dog exactly positioned, the strip is in its proper place at the end of a feeding stroke and the piloting mechanism, while insuring proper positioning of the strip, acts principally as an anchor.

*Tape feeding means and associated structure*

The means 16 for feeding the tape is conventional and may be the same as that shown and described in my said copending application. This means includes a knurled drum 138 rotated by a shaft 140 which is journalled in a bearing 142. To expedite the clamping action, later described, the bearing is canted to dispose the shaft 140 at an angle to the drive shaft 12 in both plan and elevation.

The drum shaft 140 carries a ratchet wheel 144 which is turned by a pawl 146 (Fig. 2) pivotally mounted on one arm of a bell crank lever 148, and pressed against said wheel by a spring 147. The bell crank lever is rotatably mounted on the shaft 140 and has fixed to its other arm a stud 149 which is secured to the inner race of a self-aligning anti-friction bearing 150. The outer race of said bearing is clamped in the split gudgeon end 152 of an eccentric rod 154 which actuates the tape feeding means. The split strap end of this rod is clamped about the outer race 156 of another self-aligning anti-friction bearing 158 whose inner race 160 is force-fitted on an eccentric sheave 162 keyed to drive shaft 12.

Although the aparallelism of the drum shaft 140 and drive shaft 12 is slight and an ordinary bearing might function satisfactorily at a relatively low speed of 2,000 cycles per minute, I have found that where the speed is increased to over 3,000 revolutions per minute, vibration, stress and wear are materially lessened by the use of self-aligning anti-friction bearings. In addition, these bearings permit wide adjustment of the plan and elevation angles of the drum shaft 140 to facilitate operation of the clamping means.

A check pawl 164 is pivotally mounted on a post 166 secured to the pedestal 168 which supports the drum bearing 142. Said pawl is urged by a spring 170 against the ratchet wheel 144 to aid in preventing retrograde movement or chattering of said wheel during the non-operative stroke of the feed pawl 146.

A smooth-faced shoe 172 pivotally mounted on the lower end of a rod 174 is resiliently pressed against the tape T by a compression spring 176 to insure good frictional contact between the tape and drum 138. Said rod 174 is slidably supported by a bracket 178 extending from the drum bearing 142. This bracket also serves to provide a thrust surface for the upper end of the compression spring 176. The usual nuts 180 are screwed on the top of the shaft 174 to provide for adjusting the pressure of the shoe 172 on the tape T and a conventional cam 182 and follower ring 184 allow shoe pressure to be wholly released when the tape is being threaded through the machine. A pin 186 facilitates turning of said follower ring.

The tape is fed from a spool (not shown) to the machine 10 through formed tensioning shoes 188, 190 beneath the bed 26 (Fig. 3), one of said shoes 188 being stationary and the other 190, which is supported on a pivoted lever 192, being urged against the stationary shoe 188 by a spring 194. A knurled handle 196 (Fig. 1) may be employed to vary the tension.

The tension imposed on the tape is appreciable and sometimes causes the tape to break at a point where the ends of two pieces are attached. Since machines of the character described run automatically and are not under close surveillance, when a break does occur the machine continues to go through its regular cycle of operations, cutting off elements and attempting to bend the jaws thereof about the bead of the missing tape. Such continued operation causes the machine to become littered with a mass of severed and partially mutilated slide fastener elements which accumulate very rapidly at or above 3,250 cycles per minute. With about ten per cent allowed for the periods when the strip is not fed, close to 3,000 elements a minute are discharged into the small space around the severing and clamping dies. These elements not only clutter up the machine, but in short order jam between stationary and moving parts of the various operative means and often lead to deformation and breakage of parts. To overcome this difficulty, which is particularly troublesome in ultra high speed machines such as herein disclosed, I have, in accordance with a subsidiary feature of my invention, provided an improved means for stopping the machine 10 in the event that the tape breaks. This means for stopping the machine is controlled by the tape and in general comprises a tape break detector, that is, a means which is sensitive to the continued presence of the tape in the region near where severing and clamping occur and means, governed by the detector, for opening the circuit which supplies electric power to the motor M. The tape break detector consists of a micro-switch 197 (an extremely sensitive electric switch) which is housed in an elongated pencil-like casing 198 from whose forward tapered end a finger 200 protrudes. The casing is so supported on the machine by a flexible mounting 202 that the finger 200 rides on the taut moving tape T and is pressed thereby into the housing 198 against the action of a spring 204 within said housing. Said finger when urged into the casing 198 closes the micro-switch and completes the circuit energizing the motor M. When the tape breaks, the spring 204 will thrust the finger out, opening the motor circuit at the micro-switch 197 and thus stopping operation of the machine 10.

*The severing means and associated structure*

The severing means 180, in its general aspects, is largely conventional. It comprises a head 206 bolted to the bed 26 and having ways 208 in which a ram 210 is mounted for vertical reciprocation. The ram carries a shearing die 212 which cooperates with an anvil 214 to sever the foremost slide fastener element from the strip S. The ram is urged to its extreme upper position by a compression spring (not shown) which presses against a top plate 216 on the ram and is bottomed against the base of a well (not shown) in the head. Said ram is intermittently forced down against the action of the compression spring by a screw 218 adjustably carried on the driving end 220 of a ram lever 222 (Fig. 6). The lever is journalled on a countershaft 234 spanning the main bearings 22, 24 above the drive shaft 12. To reduce friction at this point an anti-friction bearing rotatably connects the lever 222 and its shaft 224. Such anti-friction bearing, in the illustrated embodiment of my invention, comprises a needle or roller bearing 226 entirely housed within a heavy hub 228 forming an integral part of the ram lever 222. The driven end of said lever consists of a pair of parallel arms 230 having aligned terminal collars 232 in which is force-fitted a shaft 234 whose central portion is pressed into the inner race of an anti-friction bearing 236, such as a double row ball bearing. The outer race of this bearing is pressed into the gudgeon end 238 of an eccentric rod 240 whose strap end 242 has the outer race of another anti-friction bearing 244 tightly secured therein. The inner race of this latter bearing is pressed-fitted in an eccentric sheave 246 keyed to the drive shaft 12. The last mentioned bearing 244 may, like the anti-friction bearing 236, be of the double row ball bearing type.

It will be noted that the three anti-friction bearings 226, 236 and 244 employed in the actuating mechanism for the severing means are not of the self-aligning type since the shafts 234 and 224 are parallel to the drive shaft 12. However, it will be understood that if the machine is so constructed that the severing means includes an element actuated from the drive shaft and oscillatable about a counter-shaft aparallel to the drive shaft 12 that self-aligning anti-friction bearings will be employed at the two ends of the eccentric rod interconnecting this element and the eccentric sheave for actuating the same.

*The clamping means and associated structure*

During the time that the foremost slide fastener element is severed from the strip S, its jaws are clamped about the bead of the tape T. The clamping means 20, which performs this operation, comprises a pair of levers 250, 252, each of which is independently fulcrumed on a separate pivot pin 254, 256. These pins are supported on the bed 26 and have a bridging plate 258 connecting their tops to reinforce the same. The ends of the levers extending towards the ram 210 carry clamping blades 260 of conventional construction, the same being shown and described in my said copending application.

Each of the levers has at its opposite end a stud 262, 264 which extends therefrom and is force-fitted in the inner race of one of a pair of self-aligning anti-friction bearings 266, 268. The first of these bearings 266 is a ball bearing whose outer race is clamped in a split collar 270 on the gudgeon end of an eccentric rod 272 whose split strap end 274 is clamped about the outer race of another self-aligning ball bearing 276. The inner race of this latter ball bearing 276 is pressed on an eccentric sheave 278 keyed to the drive shaft 12. The second self-aligning bearing 268, also a ball bearing, is secured to the small end of an eccentric rod 280 whose large end is attached through the medium of a self-aligning ball bearing 282 to an eccentric sheave 284 keyed to the drive shaft 12.

As is apparent from inspection of the eccentric sheaves 278, 284, the clamping jaws on the levers 250, 252 will reciprocate oppositely and press together the spread legs of a slide fastener element severed from the strip whereby to clamp the same about the bead of the tape.

The bed 26 has arcuate recesses 286, 288 beneath the strap ends of the two eccentric rods 280, 272 to provide clearance therefor. Similar recesses are formed beneath the strap ends of the previously described eccentric rods 80, 154 and 240.

The operation of the machine

The timing of the various operative means is such that first the tape is advanced the distance desired to be provided between two adjacent slide fastener elements thereon. The tape feeding means then remains stationary. During or shortly after tape feeding the strip is advanced to place the jaws of the foremost slide fastener element on said strip astride the tape bead, the head of this element resting upon the anvil 214. The strip feeding means does not operate again in the same cycle.

As soon as the strip has come to rest the ram 210, which may have begun to move during the strip feed, comes into play. Said ram may first accurately position the strip with its piloting teeth 290 and then sever the foremost slide fastener element. This element may remain stationary while it is cut from the rest of the strip and the portion of the strip immediately behind the same allowed to depress on a floating pad 292. While the severing operation is taking place, and preferably before the same has been completed so that control over the element being attached is maintained, the clamping means begins to function to press the spread jaws of the element being severed around the bead of the tape. The ram can now be withdrawn and the clamping jaws opened to free the attached element.

This completes the cycle and advance of the tape and strip commences a new cycle of operations.

The advantages of the machine

As indicated, the main novel effect secured by my improved construction is the truly remarkable speed which the machine can attain. An attaching apparatus constructed in accordance with my copending application has an optimum speed of 2,100 cycles per minute, the term "optimum" indicating a speed at which wear and breakage of moving parts other than the dies are not appreciable. When this machine is run at a much higher speed, for example, 3,000 cycles per minute, the moving parts break in short order, excessive vibration is developed, parts which do not break are found to have worn greatly during the few minutes which they ran at excessive speed, and the slide fastener elements which have been attached are not properly positioned due to asynchronous operation of the operative means.

With my improved apparatus, however, at a speed of 3,250 cycles per minute, perfect timing is maintained, no noticeable vibration is present, the apparatus functions very quietly compared to the clattering operation of the present-day machines at lower speeds, and the apparatus will run for a long time without requiring any replacement for wear or breakage other than dies. This is a marked improvement over present-day attaching machines in which the cams and followers must frequently be replaced or repaired.

This improvement is due wholly to the use of eccentric sheaves and eccentric rods, as I have found that, if any one or more of these improved actuating mechanisms is replaced by a conventional cam and follower, the machine will no longer operate efficiently at greater than 3,000 cycles per minute.

It will thus be seen that I have provided an apparatus for making slide fasteners which achieves the several objects of this invention and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense, the invention being defined in the following claims.

Having thus described my invention, I claim as new and desire to secure by Letters Patent:

1. A high speed apparatus for severing slide fastener elements from a long strip and clamping the same on a tape, said apparatus comprising a single drive shaft, a plurality of operative means for severing elements from the strip, for clamping elements on the tape, for advancing the strip and for advancing the tape, and separate actuating mechanisms for positively actuating each of said operative means from said drive shaft, each of said actuating mechanisms including an eccentric sheave on said drive shaft, an eccentric rod connecting each sheave to its associated operative means, and an anti-friction bearing intermediate each sheave and eccentric rod.

2. A high speed apparatus for severing slide fastener elements from a long strip and clamping the same on a tape, said apparatus comprising a single drive shaft, a plurality of operative means for severing elements from the strip, for clamping elements on the tape, for advancing the strip and for advancing the tape, and separate actuating mechanisms for positively actuating each of said operative means from said drive shaft, each of said actuating mechanisms including an eccentric sheave on said drive shaft, an eccentric rod connecting each sheave to its associated operative means, and an anti-friction bearing intermediate each sheave and eccentric rod and intermediate each eccentric rod and its associated operative means.

3. An apparatus, as set forth in claim 2, wherein the anti-friction bearings associated with at least one of the sheaves are self-aligning.

4. An apparatus, as set forth in claim 2, wherein at least one of the operative means oscillates about an axis aparallel to the axis of rotation of the drive shaft and wherein the eccentric rod in the actuating mechanism for said means is connected to the sheave for said actuating mechanism and to said actuating mechanism by self-aligning anti-friction bearings.

MAURICE VOITY.

REFERENCES CITED

The following references are of record in the file of this patent:

UNITED STATES PATENTS

| Number | Name | Date |
|---|---|---|
| 954,751 | Mann | Apr. 12, 1910 |
| 1,659,266 | Hommel | Feb. 14, 1928 |
| 1,775,401 | MacMillan | Sept. 9, 1930 |
| 1,888,254 | Amiet | Nov. 22, 1932 |
| 1,952,195 | Candee et al. | Mar. 27, 1934 |
| 2,096,685 | Osgood | Oct. 19, 1937 |
| 2,141,200 | Sundback | Dec. 27, 1938 |
| 2,148,673 | Arentzen | Feb. 28, 1939 |
| 2,201,068 | Wintritz | May 14, 1940 |
| 2,215,741 | Palmgren | Sept. 24, 1940 |
| 2,267,783 | Behrens | Dec. 30, 1941 |
| 2,275,769 | Kiessling | Mar. 10, 1942 |
| 2,310,660 | Ulrich | Feb. 9, 1943 |